United States Patent [19]

Gogo et al.

[11] Patent Number: 5,203,424
[45] Date of Patent: Apr. 20, 1993

[54] CHAIN ADJUSTING DEVICE FOR VEHICLES

[75] Inventors: Kazuhiko Gogo, Saitama; Kenji Uehara, Tokyo, both of Japan

[73] Assignee: Honda Giken Kogyo Kabushiki Kaisa, Tokyo, Japan

[21] Appl. No.: 716,733

[22] Filed: Jun. 14, 1991

[30] Foreign Application Priority Data

Jun. 16, 1990 [JP] Japan .................. 2-158374

[51] Int. Cl.$^5$ .................................... B62M 27/02
[52] U.S. Cl. ........................ 180/190; 180/231; 280/284; 474/101
[58] Field of Search .............. 180/190, 231, 227; 280/284, 285, 286; 474/101, 112

[56] References Cited

U.S. PATENT DOCUMENTS

| | | | |
|---|---|---|---|
| 2,258,778 | 10/1941 | Lewis | 180/231 X |
| 3,673,884 | 7/1972 | Southiere | 180/190 |
| 4,237,744 | 12/1980 | Jolly | 180/231 X |
| 4,442,913 | 4/1984 | Grinde | 180/190 |
| 4,614,507 | 9/1986 | Ishino | 180/231 X |
| 4,616,729 | 10/1986 | Kasai | 180/231 |
| 5,007,497 | 4/1991 | Trema | 180/219 |

Primary Examiner—Margaret A. Focarino
Assistant Examiner—C. Mattix
Attorney, Agent, or Firm—Lyon & Lyon

[57] ABSTRACT

A chain adjusting device for vehicles having a rear fork pivoted to a main vehicle frame with an intermediate shaft and a driving shaft rotatably mounted to the rear fork. A primary chain coupling the intermediate shaft with the output shaft of an engine and a secondary chain coupling the intermediate shaft with the driving shaft directs power from the engine to a drive wheel. The intermediate shaft is mounted to the rear fork by means of a bearing assembly mounted to a bracket located between parallel cross members of the rear fork. An adjustment bracket is provided to mount arms associated with the bearing assembly in position.

6 Claims, 6 Drawing Sheets

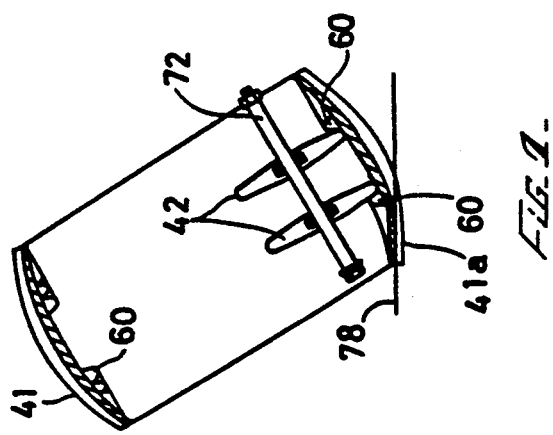
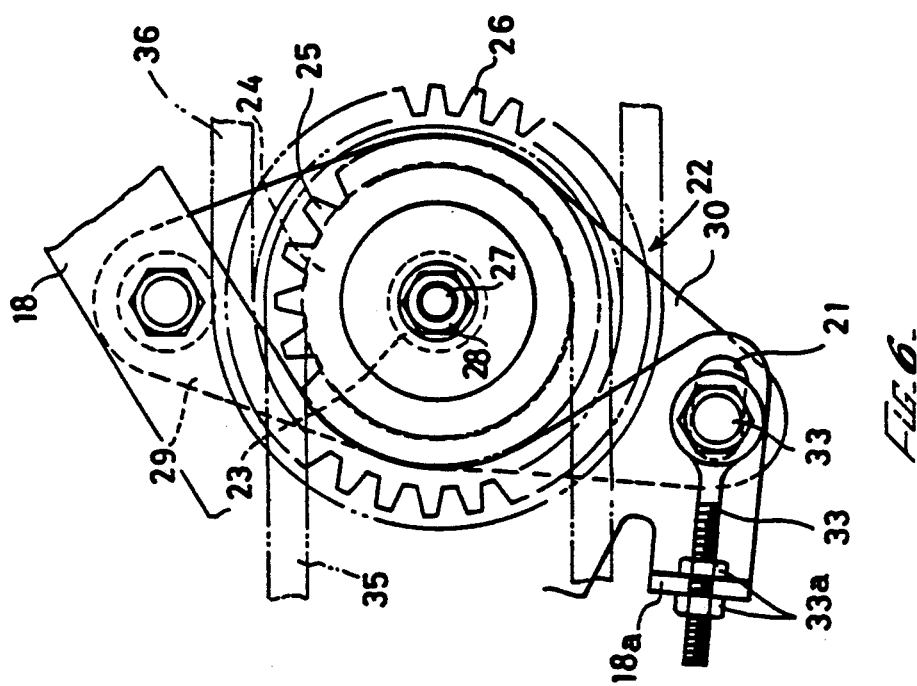
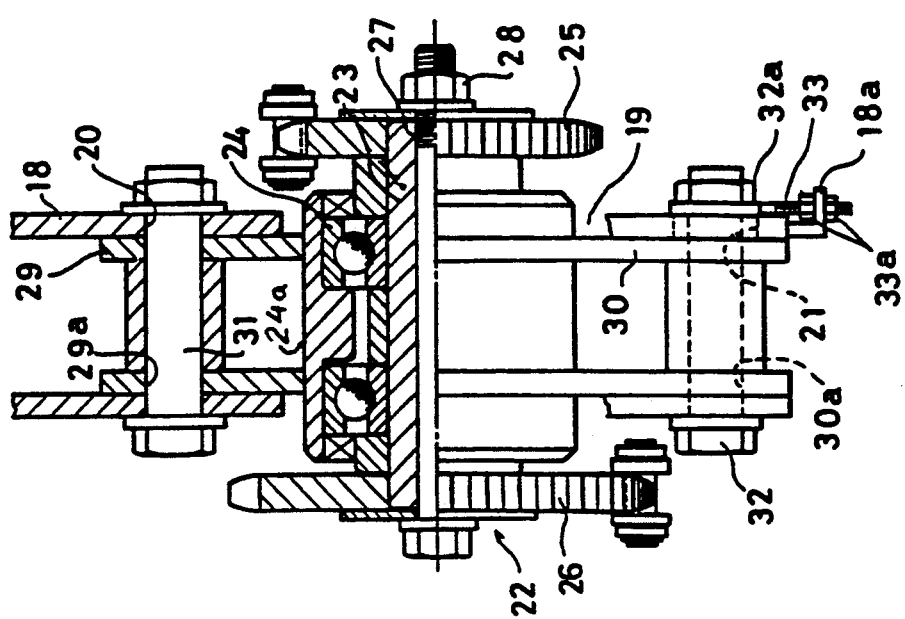

CHAIN ADJUSTING DEVICE FOR VEHICLES

BACKGROUND OF THE INVENTION

The field of the present invention is chain adjusting devices for vehicles having a rear fork pivoted to a main vehicle body with an intermediate shaft and a driving shaft coupled together by a chain to drive the vehicle.

Vehicles employing a motorcycle frame and a rear fork pivotally mounted to the frame have incorporated belt transmission mechanisms divided into two portions having an intermediate shaft. The engine output shaft is coupled with the intermediate shaft by means of a chain while the rear drive shaft driving the drive wheel is coupled to the intermediate shaft by a second chain. The intermediate shaft and drive shaft are typically rotatably mounted to the rear fork. Such an arrangement serves to raise the drive train gear ratio and improve chain performance through its positioning and vibration reduction. However, such an arrangement requires adjustment to avoid loosening and slackening of the chains as disclosed in Japanese Patent Application Laid-open No. 60-193789 in which an intermediate shaft is pivoted to an eccentric collar. The eccentric collar is rotatably received in a supporting hole provided in a rear fork to allow the position of the intermediate shaft to be adjusted with rotational adjustment of the collar. To provide support for the intermediate shaft and its bearing, such an eccentric collar conventionally is very large in diameter. In order for the rear fork to support such an eccentric collar, a large supporting hole is required in the fork structure. Such a hole increases the difficulty in creating a strong rear fork. Further, a bending moment is imposed on the intermediate shaft when the chain is under driving tension. Location of the sprocket on the intermediate shaft is influenced by the bending moment to avoid the necessity of excessive supporting structure.

SUMMARY OF THE INVENTION

The present invention is directed to a chain adjusting device for vehicles which employ a rear fork pivoted to a main vehicle frame, an endless chain or belt drive and an intermediate shaft. The intermediate shaft is positioned within a shaft mounting which includes a bearing to receive the intermediate shaft and an arm for mounting to the rear fork of the vehicle. A bracket on the rear fork adjustably engages the arm to mount the bearing with appropriate chain tension.

Given the shaft mounting, the bearing receiving the intermediate shaft is adjustably fixed to the rear fork without the necessity of a large supporting hole associated with the rear fork. The mounting makes it possible to set the support in a position apart from the rear fork structure itself.

Accordingly, it is an object of the present invention to provide an improved chain adjusting device for chain driven vehicles having intermediate drive shafts. Other and further objects and advantages will appear hereinafter.

BRIEF DESCRIPTION OF THE DRAWINGS

FIG. 5 is a front view of an intermediate shaft assembly.

FIG. 6 is a side view of the device of FIG. 5.

FIG. 7 is a plan view of a rear fork of the present invention.

DETAILED DESCRIPTION OF THE PREFERRED EMBODIMENT

Figure 1:
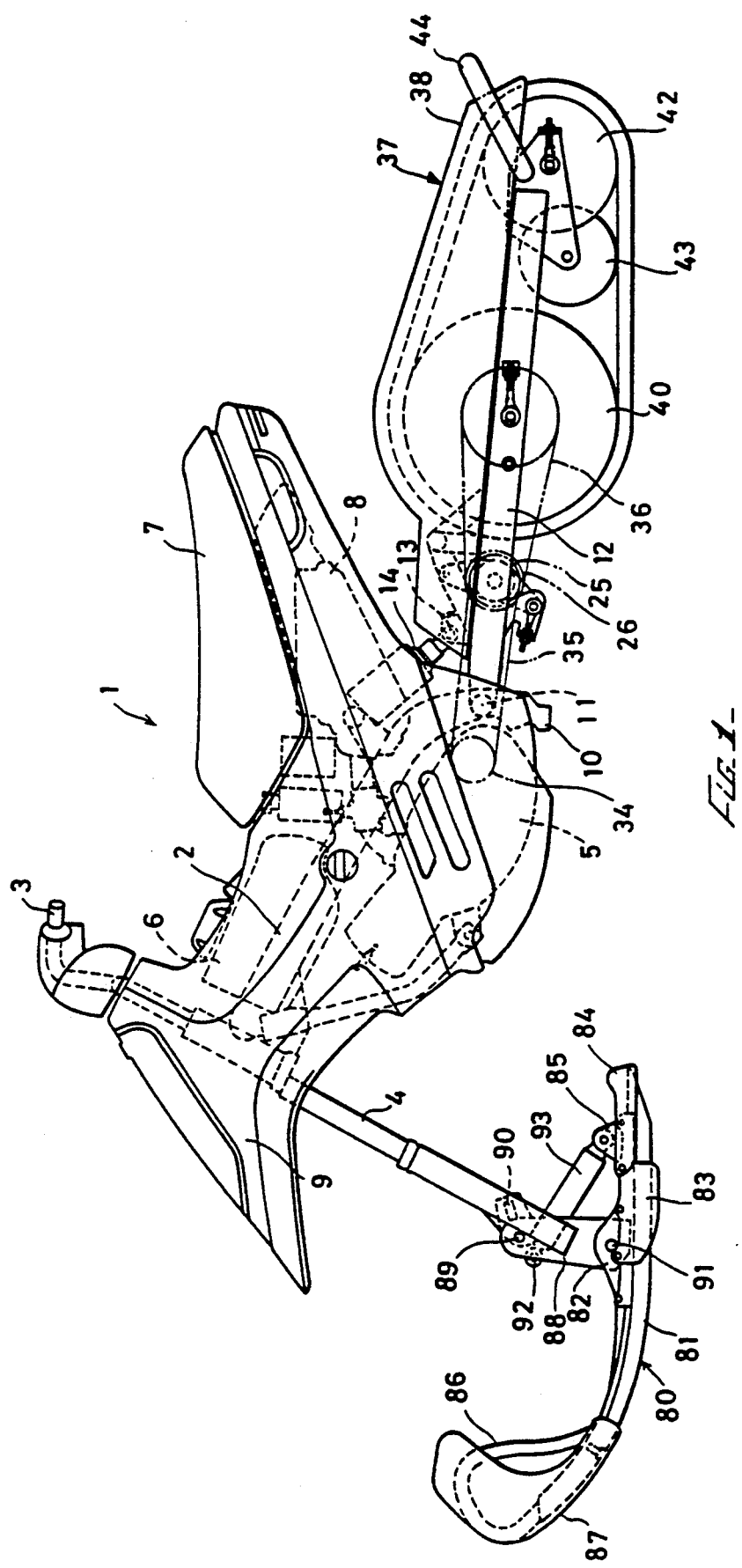
FIG. 1 is a side view showing an embodiment of the present invention.
Figure 2:
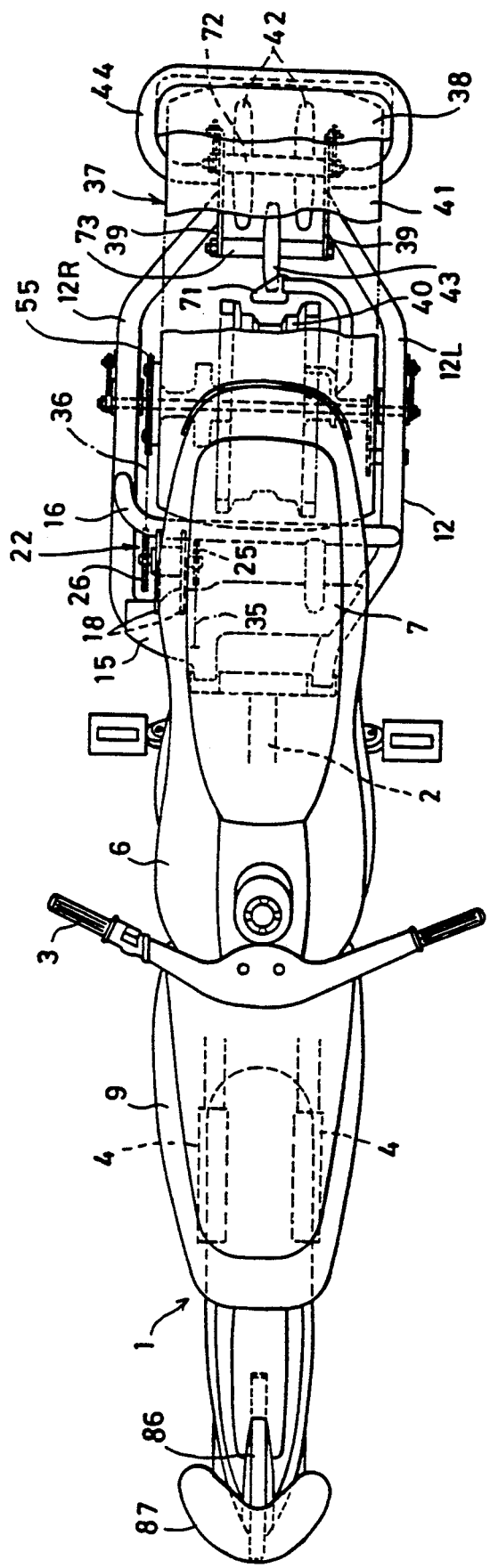
FIG. 2 is a plan view of the embodiment of FIG. 1.

Turning in detail to the drawings, a snowmobile 1 is built using a motorcycle body. A main frame 2 pivotally mounts a handlebar 3 and a front strut 4 for steering control. An engine 5 is centrally mounted within the frame with a fuel tank 6 positioned above. A seat frame is fitted with a seat 7 and an air cleaner 8. A cover 9 encircles the front and rear sides of the vehicle body.

The main frame 2 is provided at its rear end with a pivot plate 10 which mounts a pivot 11 receiving a rear fork 12. A rear cushion 14 is operatively provided between a cushion bracket 13 and a frame element associated with the main frame 2.

Figure 3:
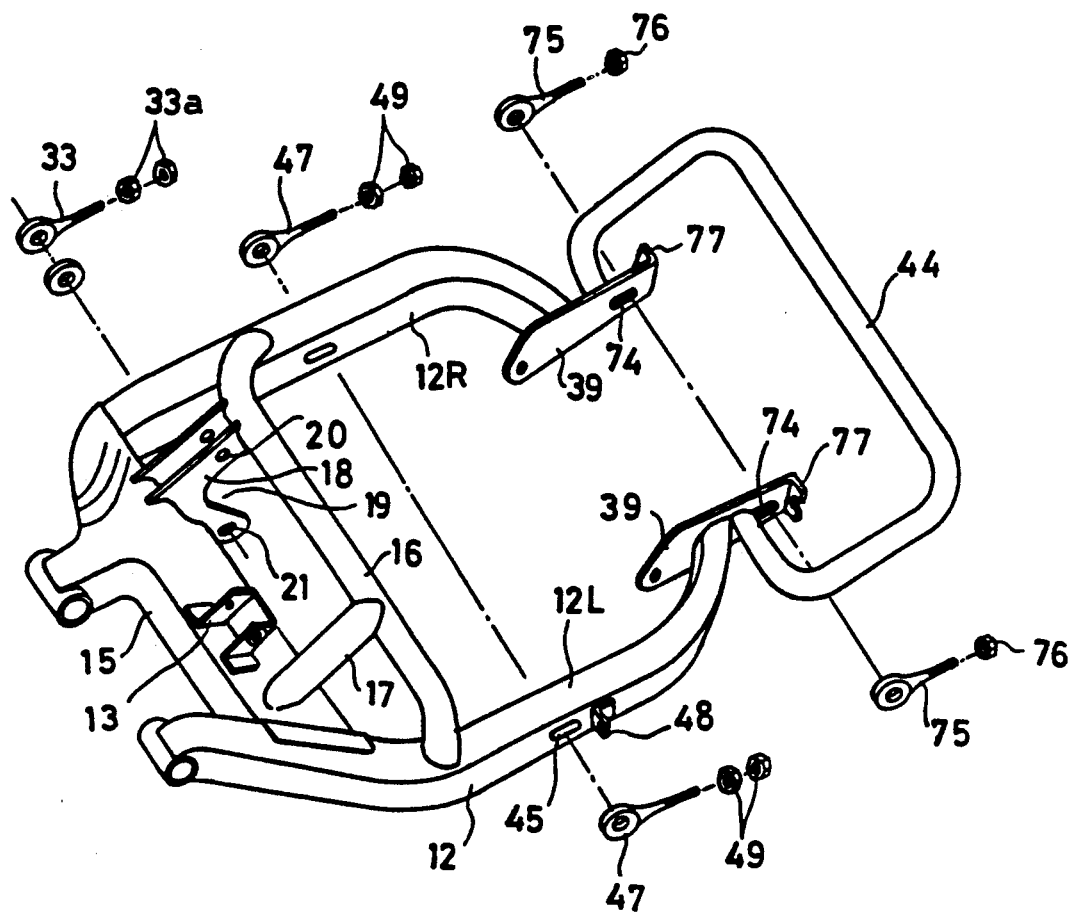
FIG. 3 is a perspective view of the rear fork.
Figure 4:
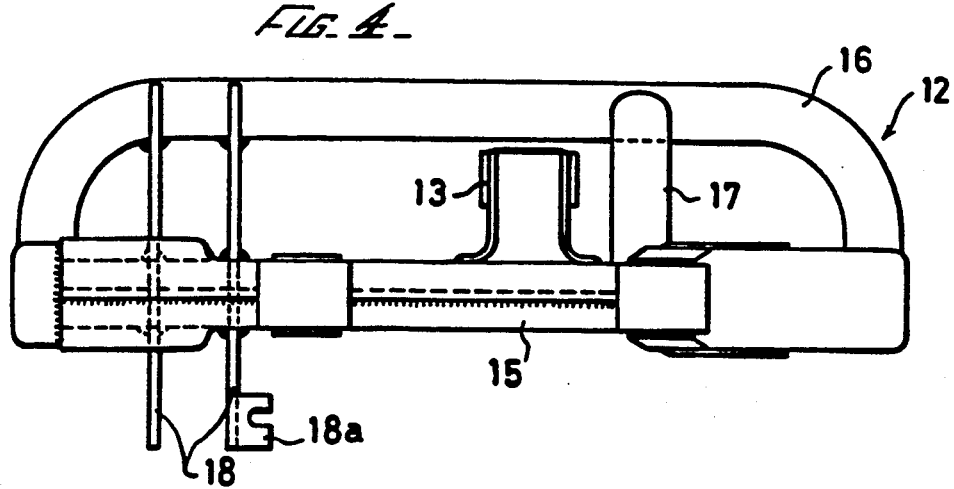
FIG. 4 is a side view of the rear fork illustrated in FIG. 3.

As best illustrated in FIG. 3, the rear fork 12 includes right and left fork elements 12R and 12L. These elements 12R and 12L are connected together with front and rear cross members 15 and 16. The cross members 15 and 16 are interconnected with a stay 17 and a pair of plates forming an intermediate shaft bracket 18. The front cross member 15 has the cushion bracket 13 welded thereto. The intermediate shaft bracket 18 is formed by the two mutually displaced and parallel plates which each are formed in the shape of an L such that there is an area between the two ends for receipt of a bearing. At a first end of the intermediate shaft bracket 18 there is a pivot hole 20. At the other end, an elongate hole 21 extends as best illustrated in FIG. 6. Adjacent to the elongate hole 21, an L-shaped flange 18a projects away from one of the plates of the bracket 18. This element is best illustrated in FIGS. 4 and 5. The flange secures an intermediate shaft assembly 22 in position.

The intermediate shaft assembly 22, as shown in FIGS. 5 and 6, comprises a hollow intermediate shaft 23 rotatably mounted within a bearing 24. The shaft 23 mounts a primary intermediate chain bracket wheel 25 and a secondary intermediate chain bracket wheel 26. A bolt 27 and a nut 28 secure the elements together in a manner to prevent relative rotation of the bracket wheel 25 and the bracket wheel 26 about the intermediate shaft 23. Extending in opposite directions from the intermediate shaft 23 are two sets of arms 29 and 30. These arms 29 and 30 include engaging holes 29a and 30a at their respective ends. The bearing 24 includes two roller bearings mounted about the intermediate shaft 23 and positioned within a bearing case 24a. The bearing case 24a is rigidly affixed within the arms 29 and 30.

The intermediate shaft assembly 22 can be fixed in a desired position by positioning the bearing case 24a in the hollow 19 defined by the bracket 18. A bolt 32 is passed through the elongate hole 21 engaging a hole 30a and an eyebolt 33. The bolt 32 is fastened by the nut 33. An adjusting nut 32a associated with the eyebolt 33 engages the L-shaped flange 18a. At the arms 29, a bolt 31 similarly extends through the hole 20 and holes 29a to affix the arms to the bracket 18. Thus, a primary chain 35 wound about the primary intermediate chain bracket wheel 25 may be adjusted so as to be tensioned by the adjustment nut 32a. The tension of a secondary chain 36 wound around the secondary intermediate chain bracket wheel is adjusted by shifting the position of an intermediate chain bracket wheel next in line.

Figure 8:
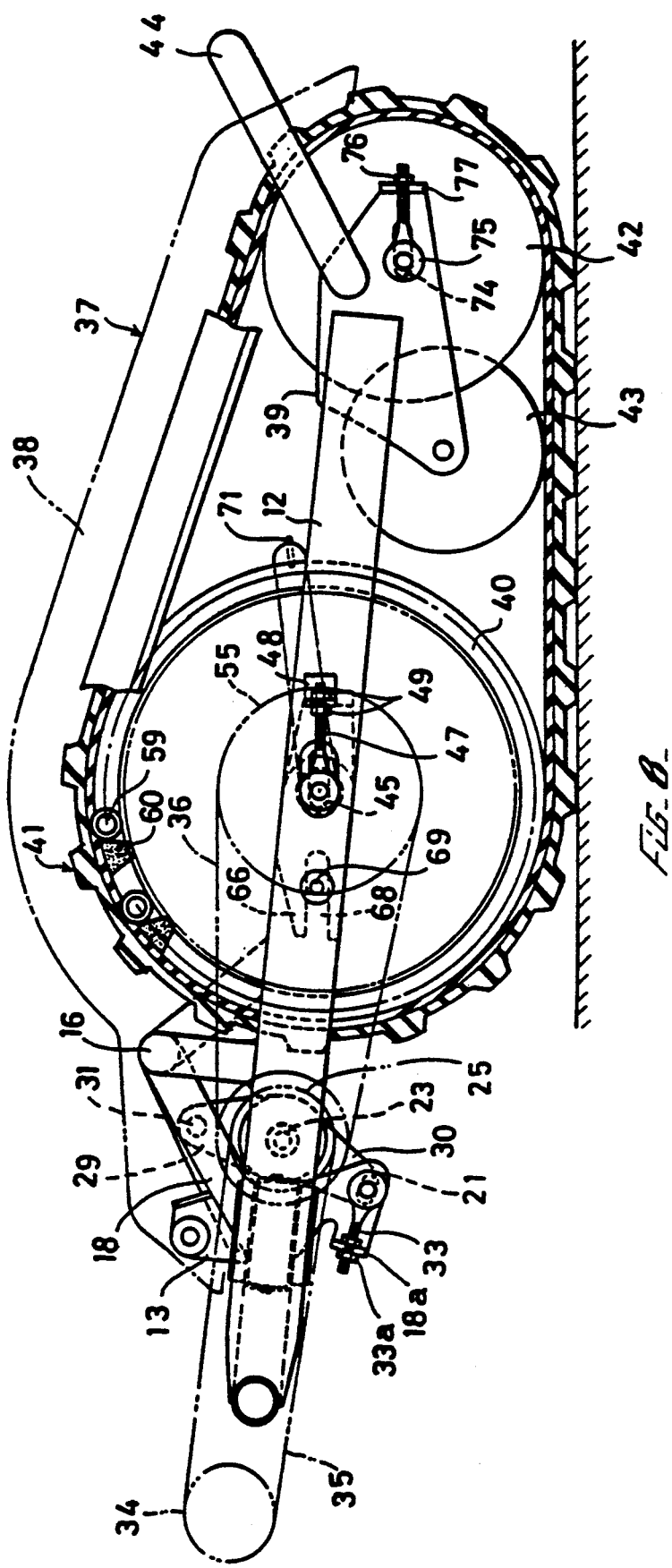
FIG. 8 is a side view of the rear fork as illustrated in FIG. 7.
Figure 9:
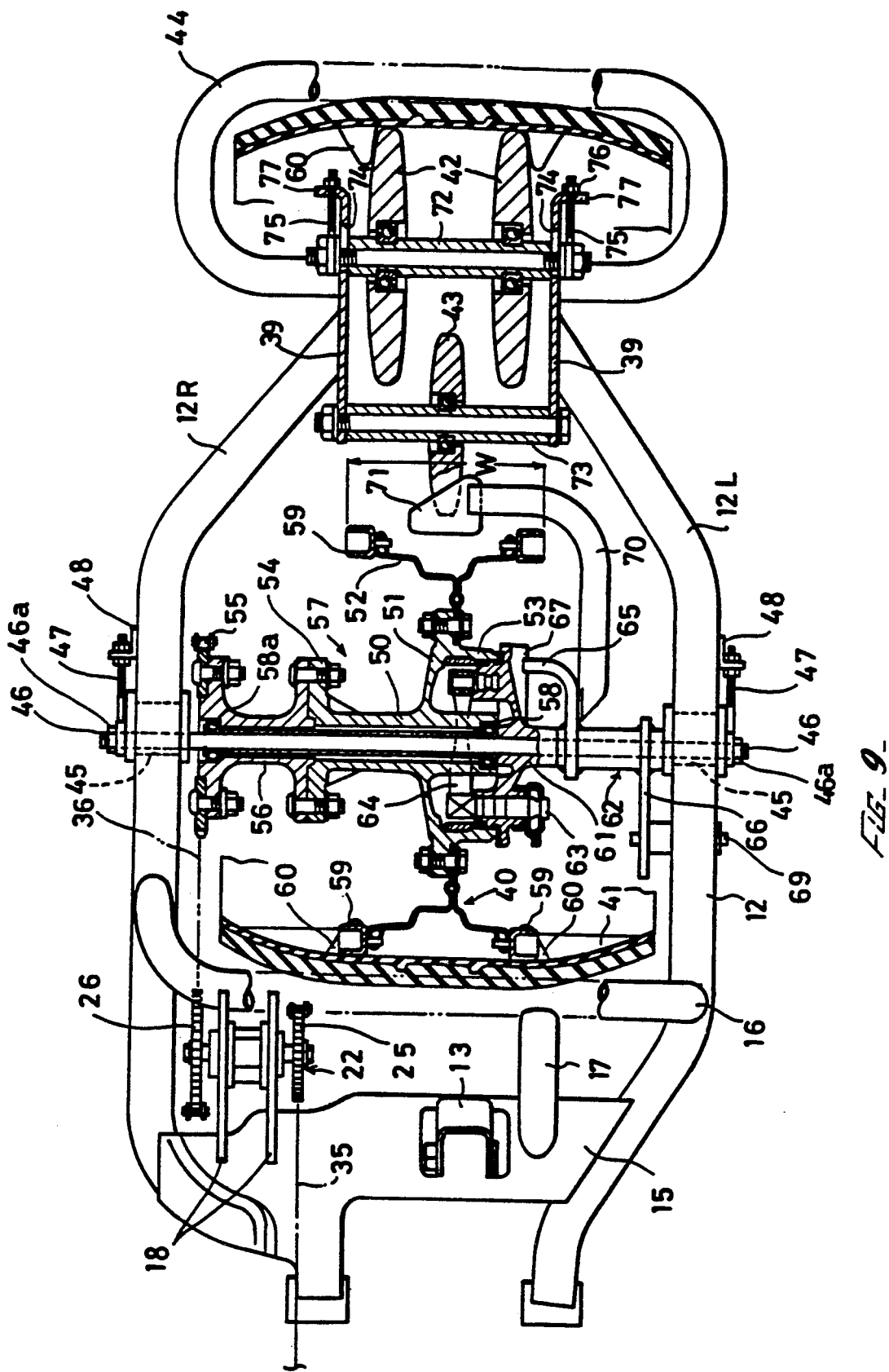
FIG. 9 is a cross sectional elevation illustrating operation of the endless belt in a turn.

As shown in FIGS. 8 and 9, a drive train, generally designated 37, driven by the secondary intermediate chain bracket wheel 26 is provided on the rear fork 12. The drive train 37 has its upper surface covered by a cover 38. The drive train 37 is composed of a driving wheel 40 driven by the secondary chain 36. The driving wheel 40 drives an endless belt 41. Guide wheels 42 and 43 guide the endless belt 41 to run on the ground a desired distance. A wheel bracket 39 is provided with a C-shaped bar 44 for lifting of the rear of the vehicle. The driving wheel 40 is rotatably supported on a securing rod 46 passing through the elongate hole 45 provided in the rear fork 12. The securing rod 46 is fixed in its position by placement of two nuts 49 and an eyebolt 47 which passes through an L-shaped flange 48 fixed to the rear fork 12.

A hub 50 of the driving wheel 40 includes a flange 51 radially projecting to fix a rim 52 thereto. The flange 51 has a brake drum 53 integrally formed therewith. On the other end of the hub, a flange 54 is provided which includes a hub 56. The hub 56 secures an intermediate chain bracket wheel 55 which, together with the hub 50, defines a driving shaft 57. The driving shaft 57 is rotatably mounted about the securing rod 46 by means of bearings 58 and 58a. The rim 52 includes driving pins 59 arranged on its edges and projecting outwardly to drive the endless belt 41 by engaging with cogs provided on the inner side of the latter, appropriately distanced.

The securing rod 46 loosely supports a brake panel 61 and a stopper 62 for conventional braking use. The brake panel 61 receives a camshaft passing therethrough which has a cam top to control a brake shoe 64. The stopper 62 has at its ends two arms 65 and 66. The arm 65 is formed in the shape of a letter L to engage with a groove 67 provided on the outer surface of the brake panel. The other arm 66 is secured to a securing pin 69 with a two-pronged element 68 (shown in FIG. 8). With the camshaft rotated, the brake panel 61 and the stopper 62 are prevented by the pin 59 from shifting their relative position so as to accommodate reaction forces caused when the brake is applied.

The arm 65 has an L-shaped scraper arm 70 extending out therefrom. The scraper arm 70 has a scraper 71 fixed to one end to face the outer circumference of the rim 52 of the driving wheel 40. This scraper 71 scrapes off snow adhering to the outer circumference of the rim 52.

The guide wheels 42 and 43 are fixed to the wheel bracket 39 with support shafts 72 and 73. The support shaft 72 passes through an elongate hole 74 to have its position adjustable in the back and forth direction and fixed in a desired position with a nut 70 engaged with a flange of the wheel bracket 39.

The outside of the driving pins 59 on both sides of the driving wheel 40 are mutually displaced a distance of W which is roughly equal to the width of the steering ski which will be explained hereinafter. The endless belt 41 includes sections 41a located outwardly of the driving wheel 40 and the guide wheel 42. Flexibility on the edge of the belt allows for movement of the sections 41a to insure gripping and substantial driving power.

The ski attached to the front strut or fork 4 is made with metal plates and comprises a flanked ski body 81 having fixed thereto a rear cover 84 composed of a raised section 82, a skid plate 83 and a bracket 85. The ski body has looped reinforcing pipes linked together and a top front cover 87 at its forward end.

The front fork 4 supports at its lower end a ski bracket 88 linked and secured thereto at two points by a pin 89 and an engaging portion 90. Linked to the other end of the bracket 88 by a pin 91 is the raised portion 82 of the ski. A secondary cushion 93 is provided between the bracket 85 and a bracket 92 at the upper portion of the bracket 88. A ski 80 is biased by the secondary cushion 93 to lift up its front portion but is prevented by a stopper which cannot be seen in the drawings from rotating out of a predetermined angle. Pressed under a load applied from the front fork 4, the secondary cushion 93 forces the lower surface of the ski 80 to be positioned on the snow surface.

With the above-described structure, the driving force of the engine 5 is transmitted from its output intermediate chain bracket wheel 34 through the primary chain 35 to the primary intermediate chain bracket wheel 25. From the primary intermediate chain bracket wheel 25 through the intermediate shaft 23 and the secondary intermediate chain bracket wheel 26, power is directed through the secondary chain 36 to the driving shaft 57 which in turn drives the driving wheel 40 to move the endless belt 41 with the driving pins 59 of the driving wheel 40. This causes the vehicle to move forward across the terrain.

A certain degree of slack in the chain may be adjusted by swinging the intermediate shaft assembly 22 about the pin 31 of the arm 29 and securing the other arm 30 with the bolt 28. The eyebolt 33 then locates the arm 30 relative to the bracket 18 for proper chain tensioning. The secondary chain is loosened by a tensioning adjustment of the primary chain. Movement of the securing rod 46 inside the elongate hole 45 with fastening in its desired position using the nut 46a and the eyebolt 47 then completes the adjustment.

Thus, the bearing support of the intermediate shaft is provided with an arm for mounting the shaft advantageously on a rear fork. The rear fork need not have a large securing hole to accommodate a bearing and an eccentric collar. This makes a compact rear fork possible. Furthermore, the structure as described above allows the intermediate shaft to be positioned away from the rear fork structure. This gives added latitude in design and allows the intermediate shaft to be short in length. This can operate to reduce bending moment under tension of the chain. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A chain adjusting device for a vehicle having a main vehicle frame, a rear fork pivotally mounted thereto, an engine having an output shaft, a drive shaft rotatably mounted on the rear fork, an intermediate shaft between the output shaft and the drive shaft, a primary chain coupling the output shaft and the intermediate shaft and a secondary chain coupling the intermediate shaft and the drive shaft, comprising a shaft mounting including a bearing receiving the intermediate shaft and an arm;

a bracket on the rear fork adjustably engaging said arm to mount said bearing to the rear fork, the rear fork including two mutually displaced structural cross members, said bracket extending between said cross members.

2. The chain adjusting device of claim 1 wherein said bracket includes two parallel and mutually spaced plates extending between the cross members and substantially normal thereto.

3. The chain adjusting device of claim 2 wherein said plates include two mounts extending therebetween, said arm being affixed to said mounts with said bearing being positioned intermediate said mounts.

4. A vehicle comprising
a motorcycle frame;
a front strut pivotally mounted to said frame;
a ski fixed to one end of said strut;
a rear fork pivotally mounted to said frame and including two mutually displaced structural cross members;
an engine having an output shaft;
a drive shaft rotatably mounted on said rear fork;
an intermediate shaft between said output shaft and said drive shaft;
a primary chain coupling said output shaft and said intermediate shaft;
a secondary chain coupling said intermediate shaft and said drive shaft;
a drive wheel mounted to said drive shaft;
an endless belt mounted about said drive wheel;
a shaft mounting including a bearing receiving said intermediate shaft and an arm;
a bracket on said rear fork adjustably engaging said arm to mount said bearing to said rear fork, said bracket extending between said cross members.

5. The vehicle of claim 4 wherein said bracket includes two parallel and mutually spaced plates extending between the cross members and substantially normal thereto.

6. The vehicle of claim 5 wherein said plates include two mounts extending therebetween, said arm being affixed to said mounts with said bearing being positioned intermediate said mounts.

* * * * *